US009163985B2

(12) United States Patent
Sano et al.

(10) Patent No.: US 9,163,985 B2
(45) Date of Patent: Oct. 20, 2015

(54) SPECTRAL CHARACTERISTIC MEASUREMENT APPARATUS AND SPECTRAL CHARACTERISTIC MEASUREMENT METHOD

(71) Applicant: Otsuka Electronics Co., Ltd., Hirakata-shi (JP)

(72) Inventors: Hiroyuki Sano, Konan (JP); Suguru Irie, Koka (JP); Tsutomu Mizuguchi, Ritto (JP)

(73) Assignee: Otsuka Electronics Co., Ltd., Hirakata-shi (JP)

( * ) Notice: Subject to any disclaimer, the term of this patent is extended or adjusted under 35 U.S.C. 154(b) by 152 days.

(21) Appl. No.: 14/010,439

(22) Filed: Aug. 26, 2013

(65) Prior Publication Data

US 2014/0063497 A1 Mar. 6, 2014

(30) Foreign Application Priority Data

Sep. 3, 2012 (JP) ................................. 2012-193211

(51) Int. Cl.
*G01J 3/28* (2006.01)
*G01J 3/18* (2006.01)

(52) U.S. Cl.
CPC .... *G01J 3/28* (2013.01); *G01J 3/18* (2013.01); *G01J 2003/2869* (2013.01)

(58) Field of Classification Search
CPC ............................ G01J 2003/2869; G01J 3/28
See application file for complete search history.

(56) References Cited

U.S. PATENT DOCUMENTS

| 5,497,230 A | 3/1996 | Ohkubo et al. |
| 5,801,829 A | 9/1998 | Mueller et al. |
| 2003/0107733 A1 | 6/2003 | Oka et al. |
| 2006/0206018 A1* | 9/2006 | Abul-Haj et al. ............. 600/316 |
| 2009/0059224 A1 | 3/2009 | Imura |
| 2010/0091280 A1* | 4/2010 | Sano et al. .................... 356/326 |

(Continued)

FOREIGN PATENT DOCUMENTS

| JP | 56-57925 | 5/1981 |
| JP | 07-128144 | 5/1995 |

(Continued)

OTHER PUBLICATIONS

Japanese Decision of a Patent Grant for corresponding JP Application No. 2012-193211, Feb. 12, 2014.

(Continued)

*Primary Examiner* — Kara E Geisel
(74) *Attorney, Agent, or Firm* — Mori & Ward, LLP

(57) ABSTRACT

A spectral characteristic measurement apparatus includes a spectrometer for spatially dispersing incident light depending on wavelengths and a detection portion for receiving light dispersed by the spectrometer. The detection portion includes a first detection area on which a component in a first wavelength range is incident and a second detection area on which a component in a second wavelength range is incident. The apparatus includes a correction portion for correcting stray light detected by the detection portion derived from light to be measured. The correction portion corrects a stray light pattern based on a first amount of change with respect to wavelengths in the first wavelength range of the stray light pattern and a second amount of change with respect to wavelengths included in a result of detection in the first detection area of the detection portion, to calculate a stray light component derived from the light to be measured.

6 Claims, 15 Drawing Sheets

(56) References Cited

U.S. PATENT DOCUMENTS

| | | | |
|---|---|---|---|
| 2012/0075628 A1* | 3/2012 | Sano et al. | 356/326 |
| 2012/0229803 A1* | 9/2012 | Sano et al. | 356/300 |

FOREIGN PATENT DOCUMENTS

| | | |
|---|---|---|
| JP | 11-030552 | 2/1999 |
| JP | 2002-005741 | 1/2002 |
| JP | 2009-053060 | 3/2009 |
| JP | 2009-222690 | 10/2009 |
| JP | 2009-281933 | 12/2009 |
| JP | 2010-117343 | 5/2010 |

OTHER PUBLICATIONS

Extended European Search Report for corresponding EP Application No. 13182014.4-1562, Dec. 10, 2013.

* cited by examiner

SPECTRAL CHARACTERISTIC MEASUREMENT APPARATUS AND SPECTRAL CHARACTERISTIC MEASUREMENT METHOD

BACKGROUND OF THE INVENTION

1. Field of the Invention

The present invention relates to a spectral characteristic measurement apparatus and a spectral characteristic measurement method capable of lessening influence by stray light.

2. Description of the Background Art

Conventionally, spectrometry has widely been used as a technique for evaluating an illuminant and the like. In a spectral characteristic measurement apparatus used in such spectrometry, a spectrometer (typically, a diffraction grating) generally splits measured light from an illuminant or the like, which is a measurement target, into wavelength components and detects each resultant wavelength component with a detection portion. In order to minimize influence other than light to be measured, the spectrometer and the detection portion are accommodated in a housing.

Actually, however, a result of detection by the detection portion may be affected by irregularly reflected light in the housing, light reflected in a diffused manner at a surface of the spectrometer, light having an order other than a measurement order, and the like. In general, such light is referred to as "stray light". Various methods have been proposed in order to suppress influence by such unintended stray light.

For example, Japanese Patent Laying-Open No. 2010-117343 discloses an optical characteristic measurement apparatus for measuring a spectrum in a shorter period of time with higher accuracy by calculating a correction value based on signal intensity detected in a correction area (an area where light split by a spectrometer is not incident) and calculating a corrected measurement spectrum by subtracting the calculated correction value from each component value included in a measurement spectrum detected in a detection area (an area corresponding to a surface on which light from the spectrometer is incident).

Japanese Patent Laying-Open No. 11-030552 discloses a method of correcting stray light by accurately estimating influence by the stray light appearing in measurement of light guided from a dispersion optical system of a spectrophotometer with a light receiver having a large number of light-receiving elements as a measurement constant of the spectrophotometer and by eliminating that influence.

Japanese Patent Laying-Open No. 2009-222690 discloses an inexpensive spectral measurement instrument capable of removing stray light from measurement data.

The optical characteristic measurement apparatus disclosed in Japanese Patent Laying-Open No. 2010-117343 is premised on the fact that stray light components are even over the entire wavelength range to which it has detection sensitivity. Depending on an apparatus configuration, however, the stray light components are not necessarily even over the entire wavelength range.

According to the stray light correction method disclosed in Japanese Patent Laying-Open No. 11-030552, it is necessary to calculate a ratio between intensity of a light reception signal measured by each light-receiving element and intensity of a light reception signal measured by the light-receiving element corresponding to the split wavelength, as many times as the number of light-receiving elements constituting a detection portion. Therefore, this method is relatively time-consuming.

Though the spectral measurement instrument disclosed in Japanese Patent Laying-Open No. 2009-222690 is preferred from a point of view of correction of a stray light component with the use of spectral irradiance for $\Delta\lambda$, two filters or a filter group should be used, measurement cannot quickly be conducted, and an apparatus configuration is complicated. In addition, it is difficult to achieve complete match between characteristics of the two filters, and it is difficult to enhance measurement accuracy of split spectra. Moreover, since stray light can be corrected only within a range of cut-off characteristics of the filter, only a part of a wavelength range which can be detected by a detection portion can be used for actual detection.

SUMMARY OF THE INVENTION

Realization of a spectral characteristic measurement apparatus and a spectral characteristic measurement method capable of lessening influence by stray light and measuring spectral characteristics in a shorter period of time with higher accuracy has been demanded.

A spectral characteristic measurement apparatus according to one embodiment of the present invention includes a spectrometer for spatially dispersing incident light depending on wavelengths and a detection portion for receiving light dispersed by the spectrometer. The detection portion includes a first detection area on which a component in a first wavelength range is incident and a second detection area on which a component in a second wavelength range on a longer wavelength side of the first wavelength range is incident. The spectral characteristic measurement apparatus includes a filter arranged in a stage preceding the spectrometer, for cutting off the first wavelength range and a storage portion for storing a stray light pattern representing stray light that will be detected by the detection portion. The stray light pattern is obtained from a result of detection in the detection portion, of reference light having intensity in a partial wavelength range on a longer wavelength side in the second wavelength range. The spectral characteristic measurement apparatus includes a correction portion for correcting stray light detected by the detection portion derived from light to be measured. The correction portion corrects the stray light pattern based on a first amount of change with respect to wavelengths in the first wavelength range of the stray light pattern and a second amount of change with respect to wavelengths included in the result of detection in the first detection area of the detection portion, to calculate a stray light component derived from the light to be measured.

Preferably, the correction portion expands or reduces the stray light pattern in an amplitude direction based on the first amount of change and the second amount of change.

Further preferably, the correction portion carries out offset correction of the expanded or reduced stray light pattern in accordance with difference in amplitude in the first wavelength range between the expanded or reduced stray light pattern and a measurement spectrum obtained by detection of the light to be measured.

Preferably, the correction portion corrects the stray light pattern such that, in the second wavelength range, the corrected stray light pattern matches in waveform with a measurement spectrum obtained by detection of the light to be measured.

Preferably, the first and second amounts of change include inclination with respect to wavelengths.

A spectral characteristic measurement method according to another embodiment of the present invention includes the steps of causing light to be measured, which has intensity in a second wavelength range, to be incident on a detection portion including a first detection area associated with a spectrometer and configured such that a component in a first wavelength range is incident thereon and a second detection area configured such that a component in the second wavelength range on a longer wavelength side of the first wavelength range is incident thereon, and correcting a stray light component derived from the light to be measured, with respect to a result of detection in the detection portion. The correcting step includes the step of reading a stray light pattern representing stray light that will be detected by the detection portion. The stray light pattern is obtained from a result of detection in the detection portion, of reference light having intensity in a partial wavelength range on a longer wavelength side in the second wavelength range. The correcting step includes the step of calculating a stray light component derived from the light to be measured, by correcting the stray light pattern based on a first amount of change with respect to wavelengths in the first wavelength range of the stray light pattern and a second amount of change with respect to wavelengths included in the result of detection in the first detection area of the detection portion.

Preferably, the correcting step includes the step of expanding or reducing the stray light pattern in an amplitude direction based on the first amount of change and the second amount of change.

Further preferably, the correcting step includes the step of carrying out offset correction of the expanded or reduced stray light pattern in accordance with difference in amplitude in the first wavelength range between the expanded or reduced stray light pattern and a measurement spectrum obtained by detection of the light to be measured.

Preferably, the correcting step includes the step of correcting the stray light pattern such that, in the second wavelength range, the corrected stray light pattern matches in waveform with a measurement spectrum obtained by detection of the light to be measured.

Preferably, the first and second amounts of change include inclination with respect to wavelengths.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
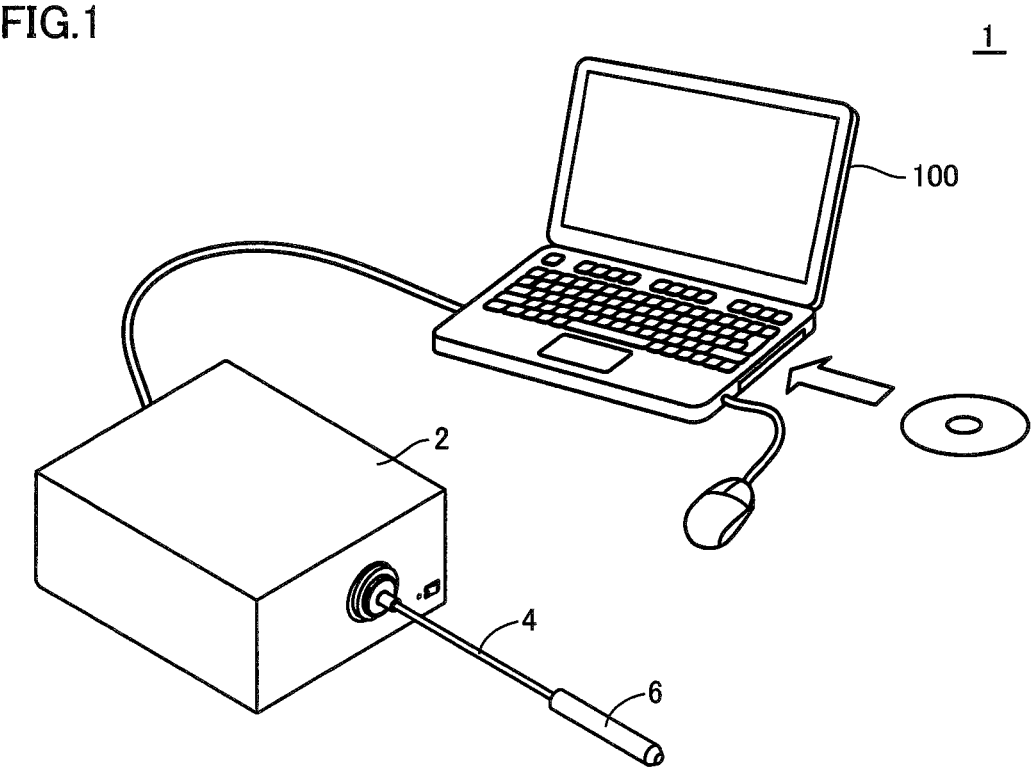
FIG. 1 is an external view of a spectral characteristic measurement apparatus according to an embodiment.

An embodiment of the present invention will be described in detail with reference to the drawings. It is noted that the same or corresponding elements in the drawings have the same reference characters allotted and description thereof will not be repeated.

A. Overall Configuration of Apparatus

FIG. 1 is an external view of a spectral characteristic measurement apparatus 1 according to the present embodiment.

Referring to FIG. 1, spectral characteristic measurement apparatus 1 according to the present embodiment measures spectral characteristics (typically, a spectrum) of various illuminants (hereinafter also referred to as an "object"). Spectral characteristic measurement apparatus 1 can also calculate such optical characteristics as brightness and tint of the object based on the measured spectrum. Brightness refers to luminance, luminous intensity and the like of the object, and tint refers to a chromaticity coordinate, a dominant wavelength, excitation purity, a correlated color temperature, and the like of the object. Spectral characteristic measurement apparatus 1 is applicable also to measurement for a light emitting diode (LED), a flat panel display (FPD), and the like.

Spectral characteristic measurement apparatus 1 includes a spectral measurement instrument main body (hereinafter, referred to as a "measurement instrument main body") 2 and a processing device 100. An optical fiber 4 provided with a probe 6 at its tip end is connected to measurement instrument main body 2. Light to be measured (hereinafter also referred to as "measured light"), which is emitted from the object, is taken in from probe 6 and guided to measurement instrument main body 2 through optical fiber 4.

As will be described later, measurement instrument main body 2 splits the measured light that enters measurement instrument main body 2 and outputs a result of detection indicating intensity of each wavelength component included therein (signal intensity) to processing device 100. Measurement instrument main body 2 contains a spectrometer for splitting measured light and a detection portion (a photodetector) for receiving light split by the spectrometer.

Spectral characteristic measurement apparatus 1 stores a stray light pattern representing stray light that will be detected by a photodetector in advance, and calculates a stray light component appearing in each measurement by correcting this stray light pattern in accordance with a situation at the time of measurement. Spectral characteristic measurement apparatus 1 outputs a result of measurement with an error originating from stray light being excluded, by correcting a spectrum obtained by measuring measured light (hereinafter also referred to as a "measurement spectrum") with the stray light component. Spectral characteristic measurement apparatus 1 lessens not only influence by an error originating from such stray light but also influence by an error originating from a dark current that flows in a photodetector.

B. Configuration of Measurement Instrument Main Body

Figure 2:
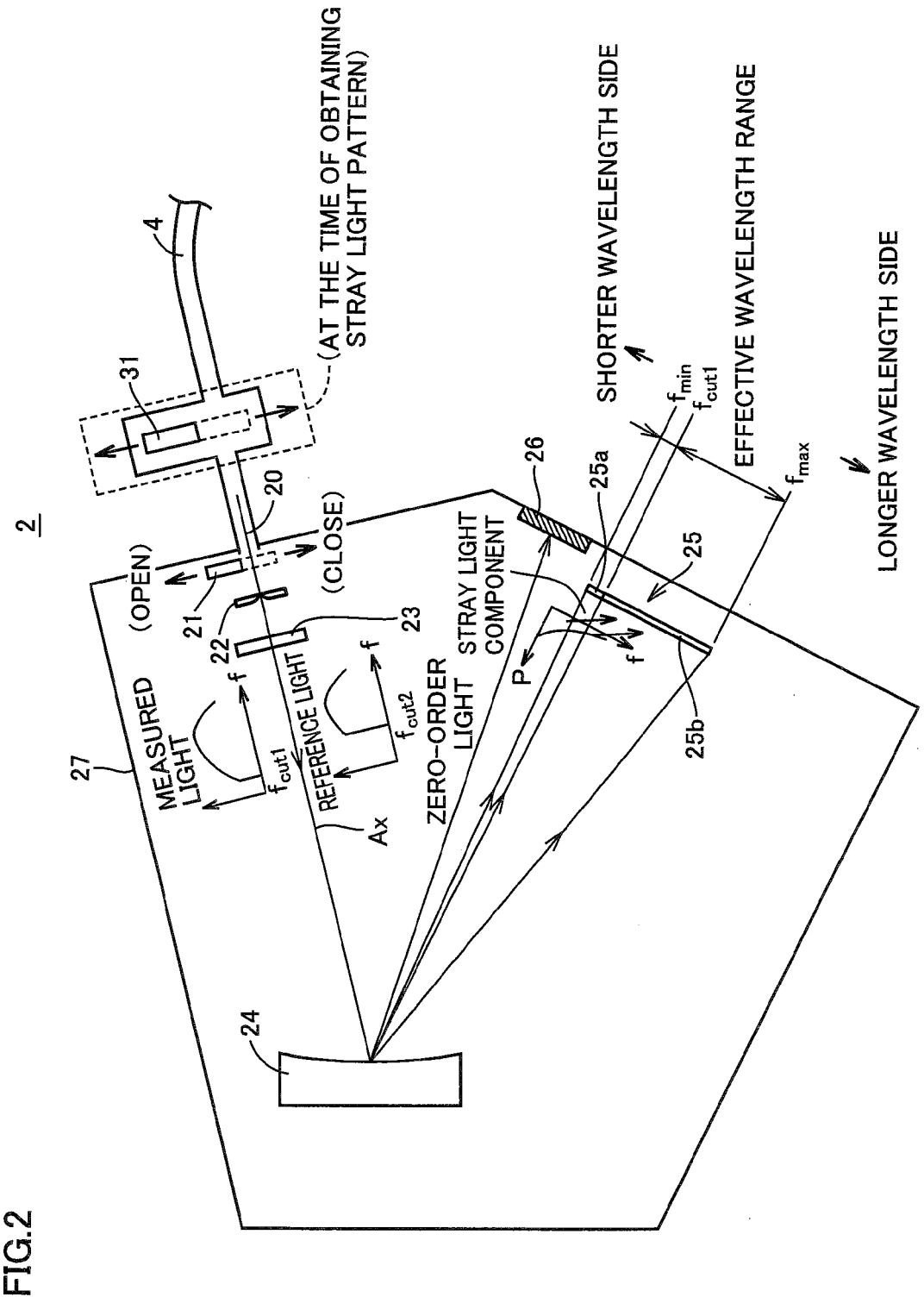
FIG. 2 is a schematic cross-sectional view of a measurement instrument main body according to the present embodiment.

FIG. 2 is a schematic cross-sectional view of measurement instrument main body 2 according to the present embodiment. Referring to FIG. 2, measurement instrument main body 2 includes a shutter 21, a slit 22, an internal cut-off filter 23, a spectrometer 24, a photodetector 25, and a light absorption portion 26. These components are accommodated in a housing 27. A light input port 20 is provided in a part of housing 27. Light input port 20 is connected to optical fiber 4. The measured light guided by optical fiber 4 enters housing 27 and propagates along an optical axis Ax. Shutter 21, slit 22, internal cut-off filter 23, and spectrometer 24 are arranged along optical axis Ax, sequentially from light input port 20. The measured light is incident on spectrometer 24 after it passes through slit 22 and internal cut-off filter 23.

Shutter 21 cuts off light that enters housing 27 from the outside of housing 27. Shutter 21 establishes such a state that light does not enter housing 27, in order to obtain a spectrum corresponding to an error caused by a dark current which flows through photodetector 25 (hereinafter also referred to as a "dark spectrum"). By way of example, shutter 21 is structured such that it can be displaced in a direction perpendicular to optical axis Ax. Thus, when shutter 21 is present on optical axis Ax (hereinafter also referred to as a "close position"), light that enters housing 27 is cut off. An operation for measuring a dark spectrum detected by photodetector 25 while the light that enters housing 27 is cut off is also referred to as "dark measurement". For distinction from this "dark measurement", an operation for measuring a spectrum of measured light is also referred to as "ordinary measurement".

When shutter 21 is present at a position distant from optical axis Ax (hereinafter also referred to as an "open position"), the measured light is taken into housing 27. Though FIG. 2 illustrates arrangement where shutter 21 is provided inside housing 27, it may be provided outside housing 27. In addition, a mechanism of any type may be adopted as a mechanism for cutting off light which enters housing 27.

Spectrometer 24 is arranged on optical axis Ax and splits the measured light incident along optical axis Ax into a plurality of components based on a wavelength. The light resulting from light split by spectrometer 24 is guided to photodetector 25. Namely, spectrometer 24 spatially disperses incident light depending on wavelengths. It is noted that, when light is incident on spectrometer 24, zero-order light is also appearing and this zero-order light is guided to a position distant from photodetector 25. Since this zero-order light causes stray light, it is absorbed by light absorption portion 26 so as to avoid irregular reflection.

By way of example, spectrometer 24 is implemented by a concave diffraction grating (grating) called blazed holographic type. This concave diffraction grating reflects incident measured light toward corresponding directions as diffraction light having prescribed wavelength intervals. Therefore, the light split by spectrometer 24 (diffraction light) is emitted toward photodetector 25 in a spatially spread manner.

Instead of the blazed holographic type concave diffraction grating described above, any diffraction grating such as a flat focus type concave diffraction grating may be adopted as spectrometer 24.

Photodetector 25 receives the measured light (diffraction light) split by spectrometer 24. Photodetector 25 detects and outputs intensity of each wavelength component included in the received measured light. Namely, photodetector 25 receives light dispersed by spectrometer 24. The intensity detected by photodetector 25 is brought in correspondence with each wavelength. Accordingly, a result of detection from photodetector 25 indicates the spectrum of the measured light. Photodetector 25 is representatively implemented by a photodiode array (PDA), in which a plurality of detection elements such as photodiodes are arranged in an array. Alternatively, a charge coupled device (CCD) in which a plurality of detection elements such as photodiodes are arranged in matrix can also be adopted. By way of example, photodetector 25 is configured to be able to output signals indicating intensities of 512 components (channels) in a range from 200 nm to 800 nm. In addition, photodetector 25 includes an A/D (Analog to Digital) converter for outputting a signal indicating a detected light intensity as a digital signal and a peripheral circuit.

In measurement instrument main body 2, spectrometer 24 and photodetector 25 are optically designed such that a component of the incident measured light in a range from a minimum wavelength $f_{min}$ to a maximum wavelength $f_{max}$ is guided to spectrometer 24. Namely, a wavelength range (a measurable range as designed) to which measurement instrument main body 2 has detection sensitivity is in a range from minimum wavelength $f_{min}$ to maximum wavelength $f_{max}$.

Slit 22 adjusts a diameter of luminous flux (size) of the measured light in order to attain prescribed detection resolution. By way of example, each slit width of slit 22 is set approximately to 0.2 mm to 0.05 mm. The measured light after passing through slit 22 enters internal cut-off filter 23. It is noted that internal cut-off filter 23 is arranged at a position substantially matching with a focus position of the measured light after passing through slit 22.

Internal cut-off filter 23 is arranged on optical axis Ax, which is an optical path through which the measured light taken into housing 27 is incident on spectrometer 24. Internal cut-off filter 23 cuts off light on a shorter wavelength side of a prescribed cut-off wavelength $f_{cut1}$ among wavelength components included in this measured light. Namely, internal cut-off filter 23 is arranged in a stage preceding spectrometer 24 and cuts off a wavelength range from $f_{min}$ to $f_{cut1}$ (a first wavelength range). Cut-off wavelength $f_{cut1}$ is set such that relation of $f_{min}<f_{cut1}<f_{max}$ is satisfied. Therefore, a wavelength range which can substantially be detected by measurement instrument main body 2 is in a range from cut-off wavelength $f_{cut1}$ to maximum wavelength $f_{max}$ (hereinafter also referred to as an "effective wavelength range").

Figure 3:
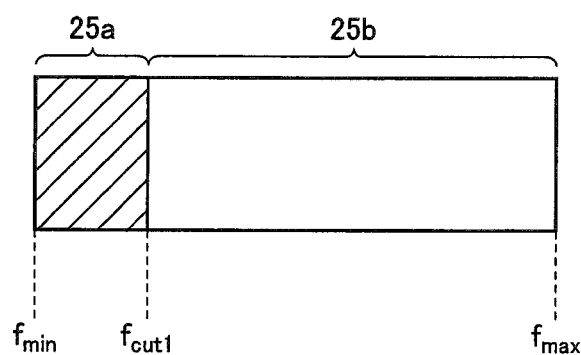
FIG. 3 is a schematic diagram showing a detection surface of a photodetector contained in the measurement instrument main body according to the present embodiment.

FIG. 3 is a schematic diagram showing a detection surface of photodetector 25 contained in measurement instrument main body 2 according to the present embodiment. Referring to FIG. 3, photodetector 25 includes as its detection surface, an effective detection area 25b corresponding to an effective wavelength range and a correction area 25a on a shorter wavelength side of the effective wavelength range. Namely, correction area 25a is structured such that a component in a wavelength range from $f_{min}$ to $f_{cut1}$ (the first wavelength range) is incident thereon and effective detection area 25b is structured such that a component in a wavelength range from $f_{cut1}$ to $f_{max}$ (a second wavelength range) on a longer wavelength side is incident thereon. Though FIG. 3 shows an example where correction area 25a and effective detection area 25b are continuously arranged, these areas may be spaced apart from each other such that a component around cut-off wavelength $f_{cut1}$ is not incident on correction area 25a.

Referring again to FIG. 2, in obtaining a stray light pattern of measurement instrument main body 2, an external cut-off filter 31 is used to cause light of which component in a prescribed wavelength range has been cut off (hereinafter, also referred to as "reference light") to enter measurement instrument main body 2. External cut-off filter 31 cuts off a component in a partial wavelength range on the shorter wavelength side of the effective wavelength range (the wavelength range from $f_{cut1}$ to $f_{max}$) of measurement instrument main body 2. Namely, external cut-off filter 31 is a high-pass filter having a cut-off wavelength $f_{cut2}$ ($f_{cut1} < f_{cut2} < f_{max}$) and allows only light having a wavelength longer than cut-off wavelength $f_{cut2}$ to pass through. Therefore, as a result of presence of external cut-off filter 31, reference light that enters measurement instrument main body 2 includes only a component longer than cut-off wavelength $f_{cut2}$. External cut-off filter 31 is required for obtaining a stray light pattern and it is not necessary to attach the external cut-off filter during ordinary measurement.

C. Overview of Correction Processing

Processing for correcting an error in spectral characteristic measurement apparatus 1 according to the present embodiment will now be described. As shown in FIG. 2, when light enters housing 27 of measurement instrument main body 2, stray light may appear. In addition, photodetector 25 is implemented by a semiconductor device such as a CCD, and a dark current flows when such a semiconductor device is driven. Due to this dark current as well, the result of detection by photodetector 25 may contain an error component (dark spectrum). Magnitude of the dark current is susceptible to an ambient temperature and it may fluctuate over time, depending on an environment for measurement.

Summarizing the above, the result of detection by photodetector 25 (the measurement spectrum) mainly includes (1) an original spectrum of the measured light, (2) an error component originating from stray light generated within housing 27 (a stray light spectrum), (3) an error component caused by a dark current that flows in photodetector 25 (a dark spectrum), and (4) other error components.

Figure 4A:
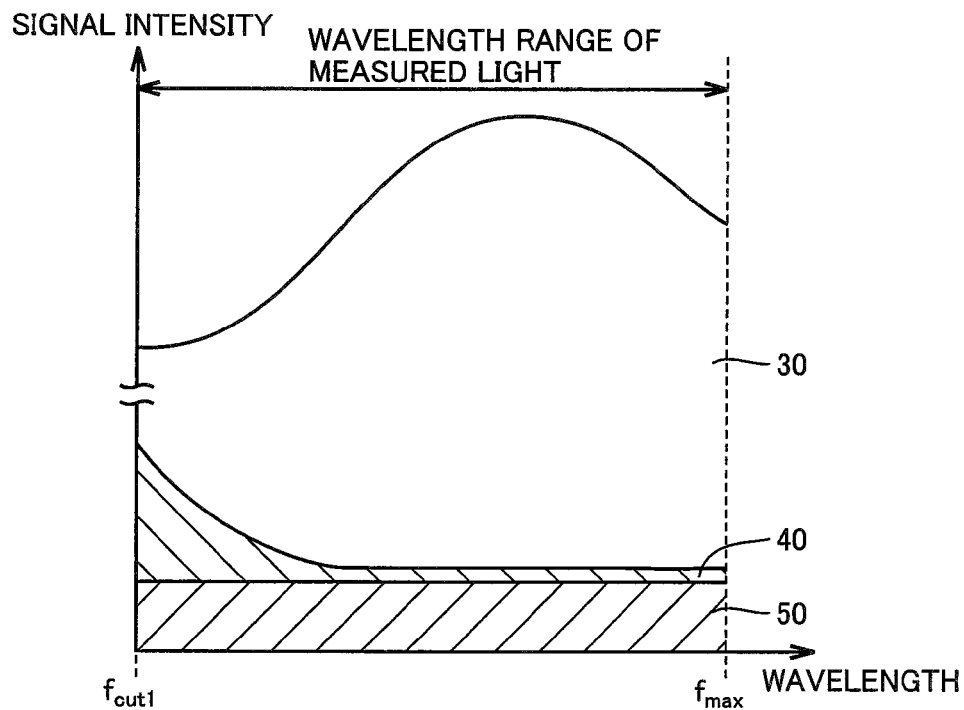
FIGS. 4A and 4B are each a conceptual diagram showing an exemplary detection result output from the photodetector in the spectral characteristic measurement apparatus according to the present embodiment.
Figure 4B:
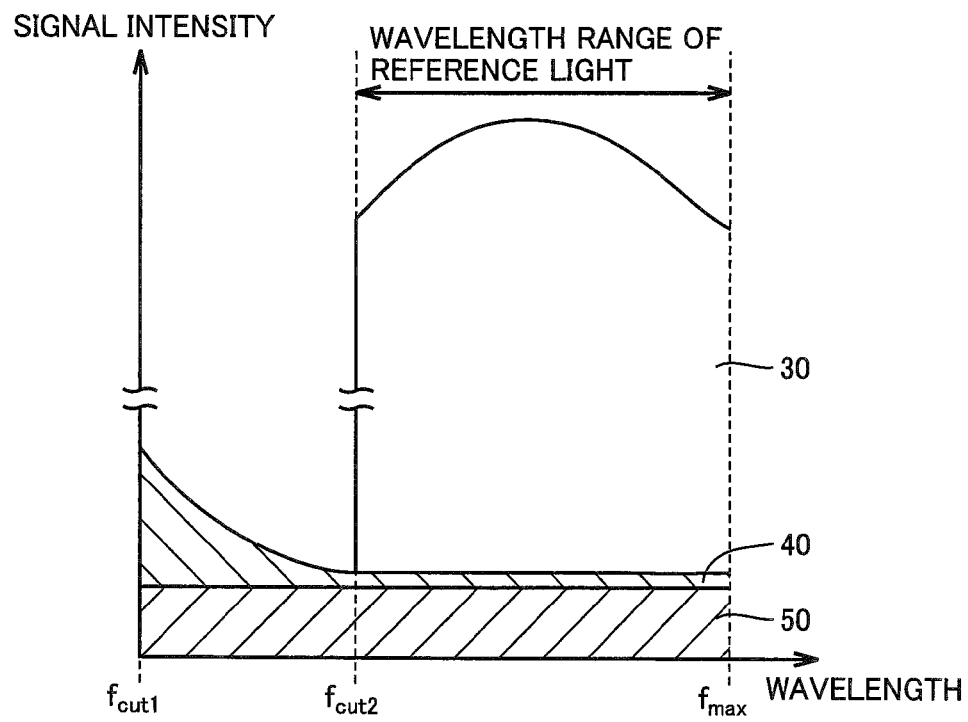

FIGS. 4A and 4B are each a conceptual diagram showing an exemplary detection result output from photodetector 25 in spectral characteristic measurement apparatus 1 according to the present embodiment. More specifically, FIG. 4A shows an example of a case where certain measured light enters measurement instrument main body 2, and FIG. 4B shows an example in a case where reference light having only a component in a part of the effective wavelength range of measurement instrument main body 2 (a wavelength range from $f_{cut2}$ to $f_{max}$) enters measurement instrument main body 2.

Referring to FIG. 4A, a result of detection (a measurement spectrum) from photodetector 25 includes not only an original spectrum 30 of measured light but also a stray light spectrum 40 originating from stray light and a dark spectrum 50 originating from a dark current.

In contrast, as shown in FIG. 4B, when reference light having only a component in the wavelength range from $f_{cut2}$ to $f_{max}$ enters measurement instrument main body 2, a portion in a wavelength range from $f_{cut1}$ to $f_{cut2}$ where no component is present (that is, intensity is zero) indicates a value reflecting only stray light spectrum 40 and dark spectrum 50. Therefore, stray light spectrum 40 can be calculated from a characteristic value of a portion of the measurement spectrum, that corresponds to the wavelength range where reference light has no intensity. It is noted that dark spectrum 50 can be calculated by dark measurement.

Figure 5:
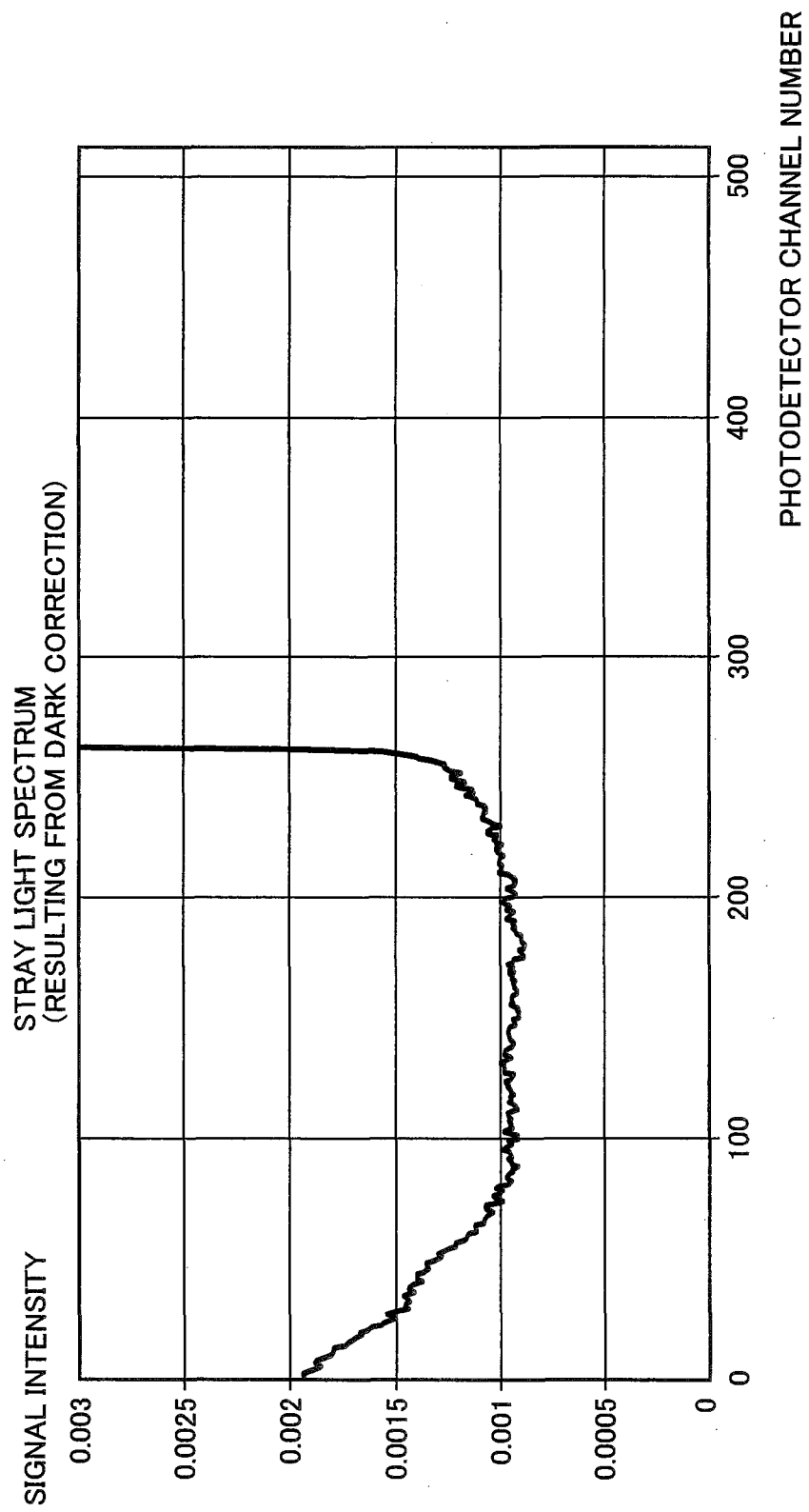
FIG. 5 shows an example of measurement of a stray light spectrum derived from reference light shown in FIG. 4B.

FIG. 5 shows an example of measurement of a stray light spectrum derived from reference light shown in FIG. 4B. In the example shown in FIG. 5, a cut-off wavelength of external cut-off filter 31 (FIG. 2) is set to 550 nm. In addition, FIG. 5 shows results resulting from dark correction (resulting from correction for removing dark spectra).

As shown in FIG. 5, it can be seen that a stray light component is greater as a channel number of photodetector 25 is smaller, that is, on a shorter wavelength side. The inventors of the present application have found based on the measurement result as shown in FIG. 5 that an error component originating from stray light (a stray light spectrum) has significantly been affected by zero-order light. Namely, the inventors of the present application have found that a channel closer to a position irradiated with zero-order light (light absorption portion 26 shown in FIG. 2) in photodetector 25 receives more zero-order light as stray light. In addition, the inventors have found that magnitude of the stray light spectrum varies depending on intensity of zero-order light, that is, intensity of the entire light which enters housing 27, however, a waveform in a wavelength region of the stray light spectrum is not dependent on intensity of stray light (an absolute value) but maintained substantially constant. In other words, the inventors of the present application have obtained new findings that a stray light pattern is specific to each measurement instrument main body 2, depending on positional relation between a position of incidence of zero-order light and spectrometer 24 as well as a position, a size, and the like of a detection surface of spectrometer 24.

Then, in spectral characteristic measurement apparatus 1 according to the present embodiment, a stray light pattern representing stray light which may be detected by photodetector 25 is obtained in advance, and at the time of each measurement, this stray light pattern is used to dynamically generate (predict) a stray light spectrum. By correcting a measurement spectrum from photodetector 25 with the use of this dynamically generated stray light spectrum, an original spectrum of measured light is more accurately measured. Namely, spectral characteristic measurement apparatus 1 includes a storage portion for storing a stray light pattern representing stray light that will be detected by photodetector 25 and a correction portion for correcting stray light detected by photodetector 25 by measured light.

The stray light pattern as described above is obtained from a result of detection by photodetector 25, of reference light having intensity in a partial wavelength range (from $f_{cut2}$ to $f_{max}$) on the longer wavelength side in the effective wavelength range (from $f_{cut1}$ to $f_{max}$). As a method for generating reference light necessary for obtaining such a stray light spectrum 40, a method of combining light from a light source having a prescribed light emission spectrum as described with reference to FIG. 2 and a wavelength filter (external cut-off filter 31) can be adopted. It is noted that the present invention is not limited to this method.

Alternatively, a semiconductor light emitting device such as laser or an LED may be employed. Since such a semiconductor device emits light of a specific wavelength or in a prescribed wavelength range, reference light having intensity in the partial wavelength range (from $f_{cut2}$ to $f_{max}$) on the longer side in the effective wavelength range (from $f_{cut1}$ to $f_{max}$) of measurement instrument main body 2 can directly be generated.

Figure 6:
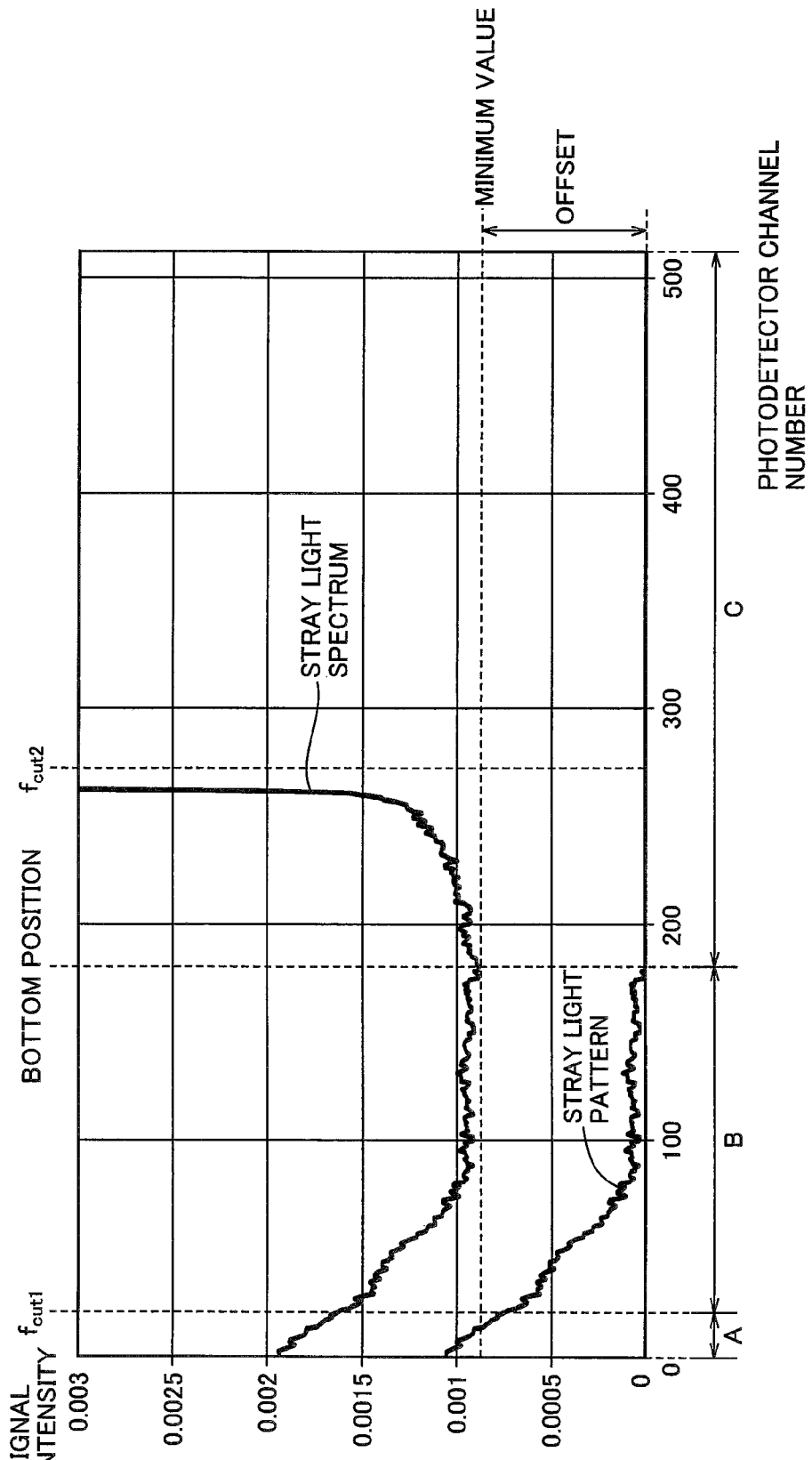
FIG. 6 shows one example of a stray light pattern calculated from the stray light spectrum shown in FIG. 5.

FIG. 6 shows one example of a stray light pattern calculated from the stray light spectrum shown in FIG. 5. Referring to FIG. 6, a stray light spectrum has such a characteristic that its signal intensity is lower as a wavelength is longer. Then, a position where signal intensity has a lowest value in a wavelength range from $f_{cut1}$ to $f_{cut2}$ of the stray light spectrum (hereinafter, also referred to as a "bottom position") is specified, and on the longer wavelength side of the bottom position (a region C in FIG. 6), signal intensity is regarded uniformly as that lowest value. With signal intensity at this bottom position being defined as an offset, a waveform obtained by subtracting this offset from the stray light spectrum is stored as a stray light pattern.

A region A in FIG. 6 is a region on which measured light is not theoretically incident, and signal intensity (resulting from dark correction) detected in region A is considered to indicate intensity of the entire stray light in the inside of measurement instrument main body 2. Then, spectral characteristic measurement apparatus 1 determines (estimates) a stray light spectrum in accordance with each measurement from the stray light pattern obtained in advance, by comparing an amount of change with respect to wavelengths corresponding to region A of the stray light pattern and an amount of change with respect to wavelengths corresponding to region A of the measurement spectrum obtained from measurement of measured light with each other. Namely, in determining a stray light spectrum from a stray light pattern, information on intensity of a signal received in correction area 25a (see FIG. 3) in photodetector 25 is used.

Figure 7:
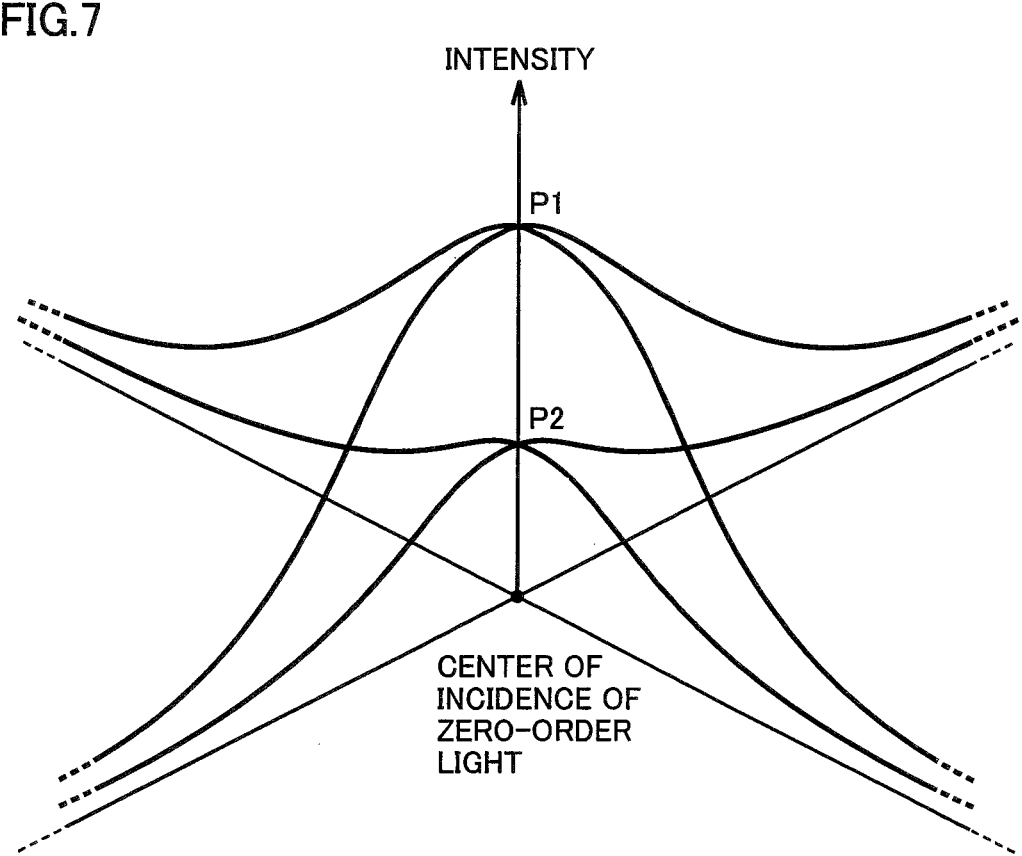
FIG. 7 is a schematic diagram illustrating spatial intensity distribution of stray light originating from zero-order light appearing in the measurement instrument main body according to the present embodiment.
Figure 8A:
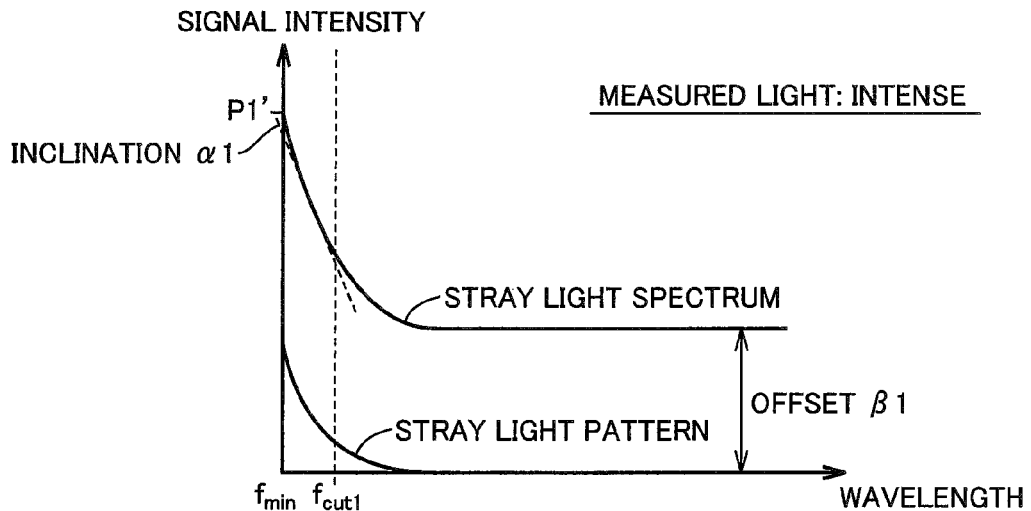
FIGS. 8A and 8B are each a conceptual diagram of a stray light spectrum calculated from a stray light pattern in the present embodiment.
Figure 8B:
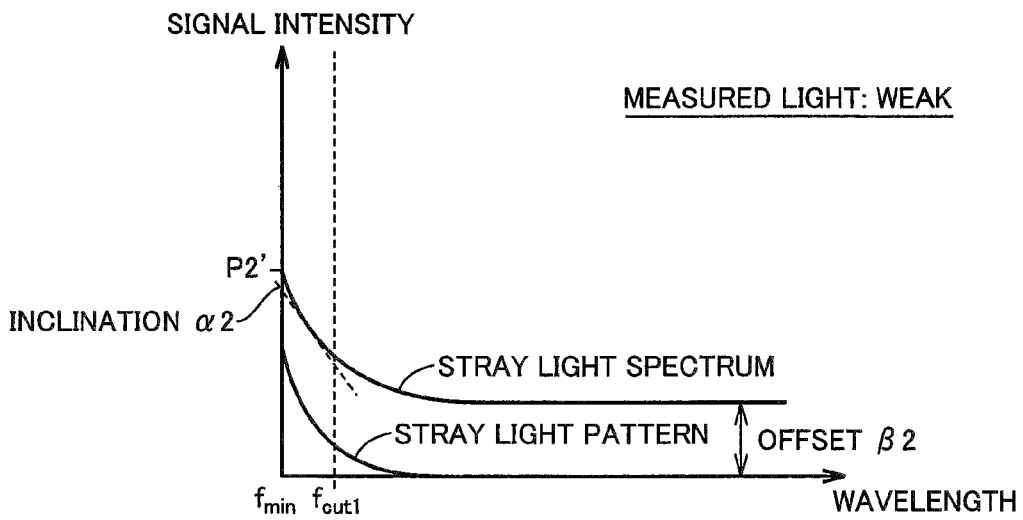

FIG. 7 is a schematic diagram illustrating spatial intensity distribution of stray light originating from zero-order light appearing in measurement instrument main body 2 according to the present embodiment. FIGS. 8A and 8B are each a conceptual diagram of a stray light spectrum calculated from a stray light pattern in the present embodiment.

Referring to FIG. 7, it is considered that influence by zero-order light (intensity of stray light) is less as a distance from the center of incidence of zero-order light is greater. In addition, it is considered that intensity of zero-order light is substantially in proportion to intensity (power) of the entire measured light which enters measurement instrument main body 2. For example, when measured light relatively high in signal intensity enters as shown in FIG. 8A, amplitude and offset of a stray light spectrum are greater, and when measured light relatively low in signal intensity enters as shown in FIG. 8B, amplitude and offset of a stray light spectrum are smaller.

A stray light spectrum at the time of each measurement is calculated by subjecting a stray light pattern to ratio correction (amplitude correction) and height correction (offset correction) based on signal intensity detected in correction area 25a in photodetector 25. Namely, spectral characteristic measurement apparatus 1 corrects the stray light pattern based on an amount of change with respect to wavelengths in the wavelength range from $f_{min}$ to $f_{cut1}$ of the stray light pattern and an amount of change with respect to wavelengths included in the result detected in correction area 25a in photodetector 25, to calculate a stray light component (a stray light spectrum) derived from measured light.

In ratio correction (amplitude correction), an inclination ratio in the wavelength range from $f_{min}$ to $f_{cut1}$ (a degree of change in signal intensity with respect to a wavelength) between the stray light pattern and the measurement spectrum (resulting from dark correction) is calculated, and the stray light pattern is expanded or reduced in an amplitude direction at this calculated ratio. Namely, by way of example of an amount of change with respect to wavelengths described above, inclination with respect to wavelengths is employed. Then, the stray light pattern is expanded or reduced in the amplitude direction based on the amount of change with respect to wavelengths of the stray light pattern and the measurement spectrum (inclination with respect to wavelengths).

More specifically, in connection with the stray light pattern and the measurement spectrum (resulting from dark correction), inclination in the wavelength range from $f_{min}$ to $f_{cut1}$ is calculated with the use of first-order approximation or the like. Then, an inclination ratio b is calculated in accordance with an expression as follows.

Inclination ratio b=(Inclination in wavelength range from $f_{min}$ to $f_{cut1}$ of measurement spectrum)/(Inclination in wavelength range from $f_{min}$ to $f_{cut1}$ of stray light pattern)

Then, by multiplying the stray light pattern by a reciprocal of inclination ratio b, the stray light pattern resulting from amplitude correction is calculated. Namely, by using inclination ratio b, the stray light pattern is subjected to amplitude correction in accordance with an expression as follows.

(Stray light pattern resulting from amplitude correction)=(Stray light pattern)/(Inclination ratio b)

In ratio correction (amplitude correction), the stray light pattern is corrected based on the inclination in the wavelength range from $f_{min}$ to $f_{cut1}$ such that, in the wavelength range from $f_{min}$ to $f_{cut1}$, it matches in waveform with a measurement spectrum.

In height correction (offset correction), a height correction value h is calculated from an average value of differences in signal intensity in the wavelength range from $f_{min}$ to $f_{cut1}$ between the measurement spectrum (resulting from dark correction) and the stray light pattern resulting from amplitude correction.

Height correction value h=Σ{(Component value of measurement spectrum (resulting from dark correction))−(Component value of stray light pattern resulting from amplitude correction)}/The number of channels The stray light spectrum is calculated by uniformly adding height correction value h to the stray light pattern resulting from amplitude correction.

(Stray light spectrum)=(Stray light pattern resulting from amplitude correction)+Height correction value h Finally, as the stray light spectrum is subtracted from the measurement spectrum, a measurement spectrum resulting from correction is output.

It is noted that an amount of change with respect to wavelengths is not limited to the inclination described above, and any feature value may be employed so long as a waveform in the wavelength range from $f_{min}$ to $f_{cut1}$ can match between the stray light pattern and the measurement spectrum (resulting from dark correction). For example, a polynomial may be used to approximate a waveform in the wavelength range from $f_{min}$ to $f_{cut1}$ and then a ratio or the like of a coefficient included in that approximated polynomial may be employed.

D. Control Structure

Figure 9:
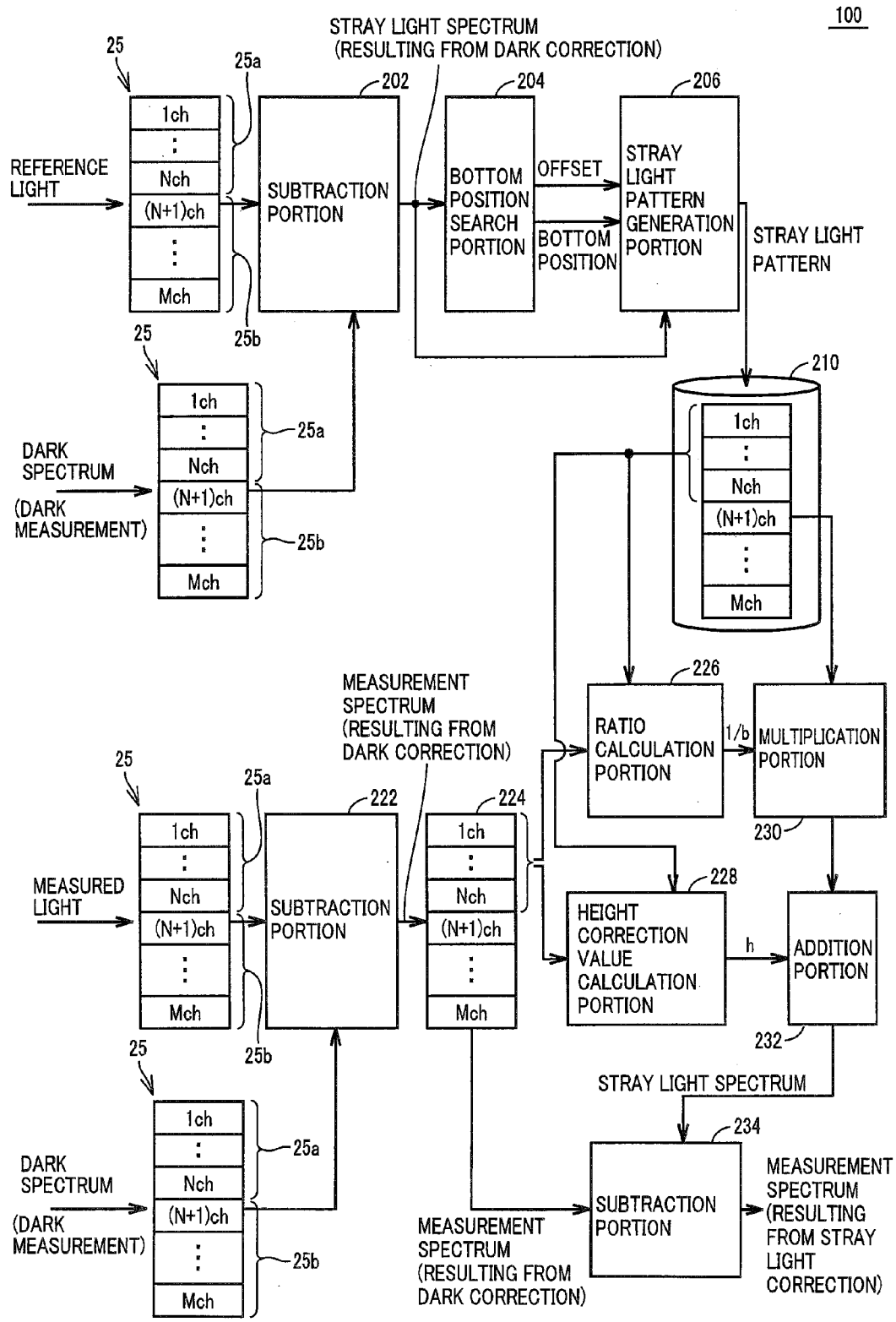
FIG. 9 is a schematic diagram showing a control structure in a processing device of the spectral characteristic measurement apparatus according to the present embodiment.

A control structure for realizing the correction processing as described above will now be described. FIG. 9 is a schematic diagram showing a control structure in processing device 100 of spectral characteristic measurement apparatus 1 according to the present embodiment. Referring to FIG. 9, processing device 100 has a control structure for obtaining a stray light pattern and a control structure for calculating a measurement result. It is noted that the control structure for obtaining a stray light spectrum does not necessarily have to be mounted on processing device 100 and it may be mounted on a different calibration device, because in principle, it is not necessary to frequently update the stray light pattern.

More specifically, processing device 100 includes a subtraction portion 202, a bottom position search portion 204, and a stray light pattern generation portion 206 as the control structure for obtaining a stray light pattern. Meanwhile, processing device 100 includes a storage portion 210, a subtraction portion 222, a buffer 224, a ratio calculation portion 226, a height correction value calculation portion 228, a multiplication portion 230, an addition portion 232, and a subtraction portions 234 as a configuration for calculating a measurement result.

By way of example, in FIG. 9, photodetector 25 has M detection elements in total, among which N detection elements (1 to N channels) on the shorter wavelength side correspond to correction area 25a (FIG. 3) while remaining (M-N) detection elements correspond to effective detection area 25b (FIG. 3).

In obtaining a stray light pattern, dark measurement and measurement of reference light are conducted. Subtraction portion 202 subtracts a dark spectrum obtained through dark measurement from a spectrum obtained through measurement of reference light to thereby calculate a stray light spectrum of reference light. Namely, subtraction portion 202 carries out dark correction. Bottom position search portion 204 searches for a position where signal intensity attains to a lowest value in the wavelength range from $f_{cut1}$ to $f_{cut2}$ of the stray light spectrum resulting from dark correction (a bottom position). Then, bottom position search portion 204 calculates a channel number corresponding to the bottom position and signal intensity (offset) thereof.

Stray light pattern generation portion 206 generates the stray light pattern by uniformly subtracting the offset calculated by bottom position search portion 204 from the stray light spectrum (resulting from dark correction) and setting a component value on the longer wavelength side of the bottom position calculated by bottom position search portion 204 to zero.

Storage portion 210 stores this generated stray light pattern.

A configuration for calculating a measurement result will now be described.

During ordinary measurement as well, dark measurement is conducted in addition to measurement of measured light. Subtraction portion 222 calculates a measurement spectrum (resulting from dark correction) by subtracting a dark spectrum obtained through dark measurement from the measurement spectrum obtained through measurement of measured light. Namely, subtraction portion 222 carries out dark correction.

Buffer 224 temporarily stores the measurement spectrum (resulting from dark correction).

Ratio calculation portion 226 reads the stray light pattern from storage portion 210, calculates inclination in the wavelength range from $f_{min}$ to $f_{cut1}$ of the stray light pattern (a degree of change in signal intensity with respect to a wavelength), calculates inclination in the wavelength range from $f_{min}$ to $f_{cut1}$ of the measurement spectrum (resulting from dark correction), and calculates ratio b between two inclinations. It is noted that inclination in the wavelength range from $f_{min}$ to $f_{cut}$ of the stray light pattern may be stored in advance in storage portion 210, together with the stray light pattern. Ratio calculation portion 226 calculates inclination in connection with the measurement spectrum (resulting from dark correction) based on signal intensity detected in 1 to N channels corresponding to correction area 25a.

Height correction value calculation portion 228 reads the stray light pattern from storage portion 210 and calculates height correction value h from an average value of differences in signal intensity in the wavelength range from $f_{min}$ to $f_{cut1}$ between the stray light pattern and the measurement spectrum (resulting from dark correction). Height correction value calculation portion 228 calculates height correction value h by calculating a difference between signal intensity detected in each of 1 to N channels corresponding to correction area 25a and a corresponding component of the stray light pattern.

Multiplication portion 230 reads the stray light pattern from storage portion 210 and multiplies the stray light pattern uniformly by 1/b. Namely, multiplication portion 230 subjects the stray light pattern to ratio correction (amplitude correction).

Addition portion 232 uniformly adds height correction value h to the stray light pattern resulting from amplitude correction. Namely, addition portion 232 subjects the stray light pattern to height correction (offset correction). Thus, the stray light spectrum is calculated.

Subtraction portion 234 calculates the measurement spectrum (resulting from stray light correction) by subtracting the calculated stray light spectrum from the measurement spectrum (resulting from dark correction).

E. Configuration of Processing Device

The processing for correcting a spectrum of measured light described above is basically performed by processing device 100. A configuration of processing device 100 will be described below.

Figure 10:
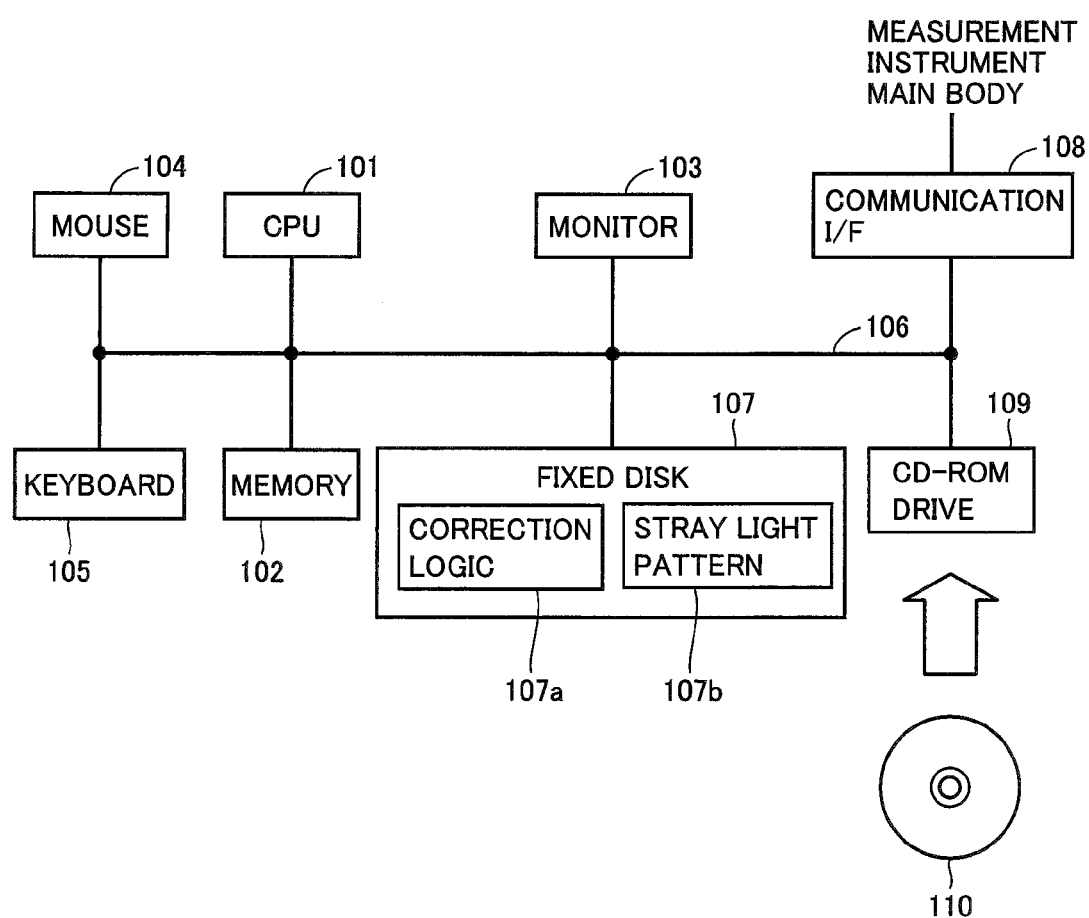
FIG. 10 is a schematic configuration diagram showing a hardware configuration of the processing device according to the present embodiment.

FIG. 10 is a schematic configuration diagram showing a hardware configuration of processing device 100 according to the present embodiment. Referring to FIG. 10, processing device 100 is representatively implemented by a computer. More specifically, processing device 100 includes a CPU (Central Processing Unit) 101, a memory 102, a monitor 103, a mouse 104, a keyboard 105, a fixed disk 107, a communication interface (I/F) unit 108, and a CD-ROM drive 109. These components are connected to each other through a bus 106.

Processing device 100 is typically implemented by execution of a program by CPU 101 using computer hardware such as memory 102.

Fixed disk 107 stores a correction logic 107a for realizing correction processing and a stray light pattern 107b obtained in advance, to be used for correction processing. Correction logic 107a is typically embodied as a program (codes) executable by CPU 101. Any data structure can be adopted for stray light pattern 107b. In general, such a program is distributed as it is stored in a recording medium such as a CD-ROM 110 or through a network or the like. Such a program is then read from a recording medium by means of CD-ROM drive 109 or the like and once stored in fixed disk 107.

CPU 101 serves as an operation processing unit for performing prescribed operations by sequentially executing various programs including correction logic 107a. Memory 102 temporarily stores various types of information as CPU 101 executes the program.

Monitor 103 is a display device for displaying a calculation result such as brightness or tint of an object that is calculated by CPU 101, and it is implemented, for example, by a liquid crystal display (LCD) or a cathode ray tube (CRT).

Mouse 104 accepts a command from a user through an operation such as clicking or sliding. Keyboard 105 accepts a command from a user in accordance with an input key.

Other output devices such as a printer may be connected to processing device 100 as necessary.

Communication interface 108 is a device for mediating data communication between processing device 100 and measurement instrument main body 2, and it receives an electric signal indicating measurement data transmitted from measurement instrument main body 2 and converts the signal into a data format adapted to processing by CPU 101, and converts commands or the like output by CPU 101 into an electric signal and sends the signal to measurement instrument main body 2.

Correction processing according to the present embodiment may be realized in its entirety or in part by using a dedicated processor, an IC (integrated circuit), or the like, instead of such a form that correction processing is provided as CPU 101 as described above executes a program. Alternatively, correction processing may be realized by using a dedicated LSI (Large Scale Integration).

F. Measurement Procedure (f1: Overview)
A processing procedure according to the present embodiment is broadly categorized into (1) processing involved with obtaining a stray light pattern (a pre-process) and (2) correction processing (ordinary measurement) including dark correction and stray light correction during ordinary measurement. Details of each processing will be described below.

It is noted that, in an actual manner of performing the processing, in a preliminary stage of shipment of a spectral characteristic measurement apparatus from a manufacturer, processing involved with obtaining a stray light pattern is performed to incorporate the obtained stray light pattern into the spectral characteristic apparatus (stray light pattern 107b in FIG. 10). Then, at the time of ordinary measurement, such a manner that stray light correction is automatically carried out in the spectral characteristic measurement apparatus using such a stray light pattern 107b is assumed as most general.

Figure 11:
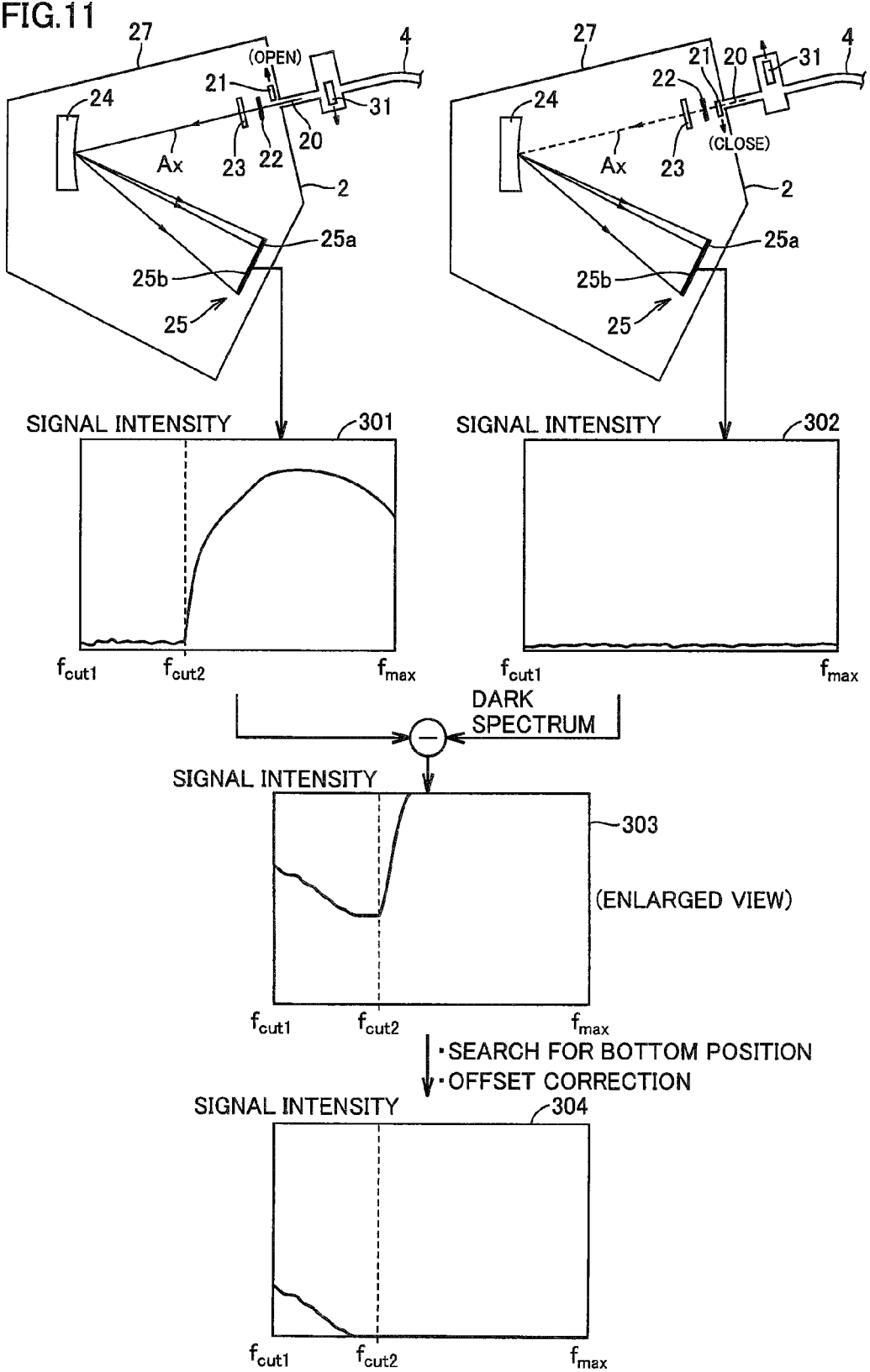
FIG. 11 is a diagram schematically showing processing contents involved with obtaining a stray light pattern according to the present embodiment.

(f2: Obtainment of Stray Light Pattern (Pre-Process))
FIG. 11 is a diagram schematically showing processing contents involved with obtaining a stray light pattern according to the present embodiment. Referring to FIG. 11, in processing for obtaining a stray light pattern according to the present embodiment, reference light of which component not higher than cut-off wavelength $f_{cut2}$ has been cut off by using external cut-off filter 31 is generated, and a spectrum 301 detected while this reference light is caused to enter measurement instrument main body 2 and a dark spectrum 302 detected while shutter 21 is driven to the close position and light does not enter measurement instrument main body 2 are obtained. Then, a spectrum 303 indicating a stray light component is calculated by subtracting dark spectrum 302 from spectrum 301 (by carrying out dark correction).

A stray light pattern 304 is calculated by searching for a bottom position in spectrum 303 and subjecting spectrum 303 to correction for offset.

Figure 12:
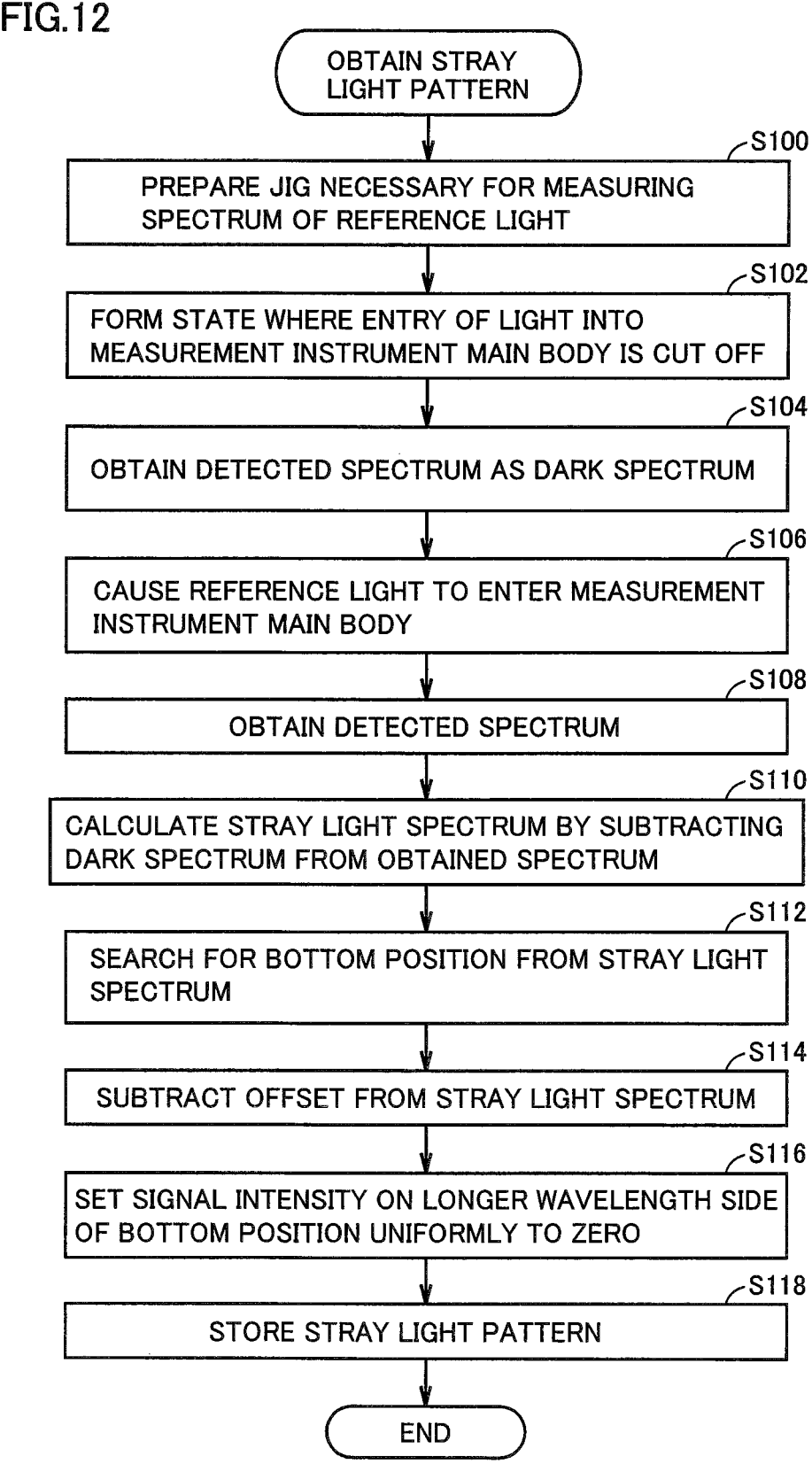
FIG. 12 is a flowchart showing a procedure involved with obtaining a stray light pattern according to the present embodiment.

FIG. 12 is a flowchart showing a procedure involved with obtaining a stray light pattern according to the present embodiment. Referring to FIG. 12, initially, a user prepares a jig necessary for spectrum measurement of reference light for calculating a stray light pattern (step S100). Specifically, external cut-off filter 31 is arranged or a light source for generating reference light is prepared. Measurement instrument main body 2 and a light source are preferably subjected to sufficient aging before measurement is started.

Then, processing for obtaining a dark spectrum shown in steps S102 and S104 is performed. In step S102, shutter 21 is driven to the close position so that a state that light is prevented from entering measurement instrument main body 2 is formed (step S102). In this state, a spectrum detected in measurement instrument main body 2 is obtained as a dark spectrum (step S104).

In succession, processing for obtaining a spectrum for calculating a stray light pattern shown in steps S106 and S108 is performed. In step S106, the user causes reference light to enter measurement instrument main body 2. Typically, reference light is generated by cutting off a component shorter than cut-off wavelength $f_{cut2}$ of light emitted from a broadband light source, with the use of external cut-off filter 31 (FIG. 2). It is noted that light having intensity only in a specific wavelength range may be employed as reference light, with the use of such a semiconductor light emitting device as laser or an LED. In this state, a spectrum detected in measurement instrument main body 2 is obtained (step S108).

It is noted that the processing for obtaining a dark spectrum shown in steps S102 and S104 described above and the processing for obtaining a spectrum for calculating a stray light pattern shown in steps S106 and S108 may be performed in any order.

In succession, processing for calculating a stray light pattern shown in steps S110 to S118 is performed. In step S110, a stray light spectrum of reference light is calculated by subtracting the dark spectrum obtained in step S106 from the spectrum obtained in step S108. In this subtraction processing, subtraction is carried out between two components for each corresponding wavelength. A bottom position of the stray light spectrum calculated in step S110 is searched for (step S112). Namely, a position where signal intensity attains to a lowest value in the wavelength range from $f_{min}$ to $f_{cut2}$ of the stray light spectrum resulting from dark correction is searched for.

Then, with the signal intensity at the bottom position searched for in step S112 being defined as the offset, this offset is uniformly subtracted from the stray light spectrum calculated in step S110 (step S114). In addition, signal intensity on the longer wavelength side of the bottom position, in the spectra calculated in step S114, is uniformly set to zero (step S116). Through the processing above, the stray light pattern is determined. The stray light pattern is typically stored in processing device 100 of spectral characteristic measurement apparatus 1 (step S118).

The stray light pattern may be standardized in the amplitude direction. Namely, signal intensity at the bottom position and on the longer wavelength side of the bottom position is set to zero, and the stray light pattern as a whole may be subjected to scaling such that a highest value of signal intensity attains to such a value as "1" or "255".

Figure 13:
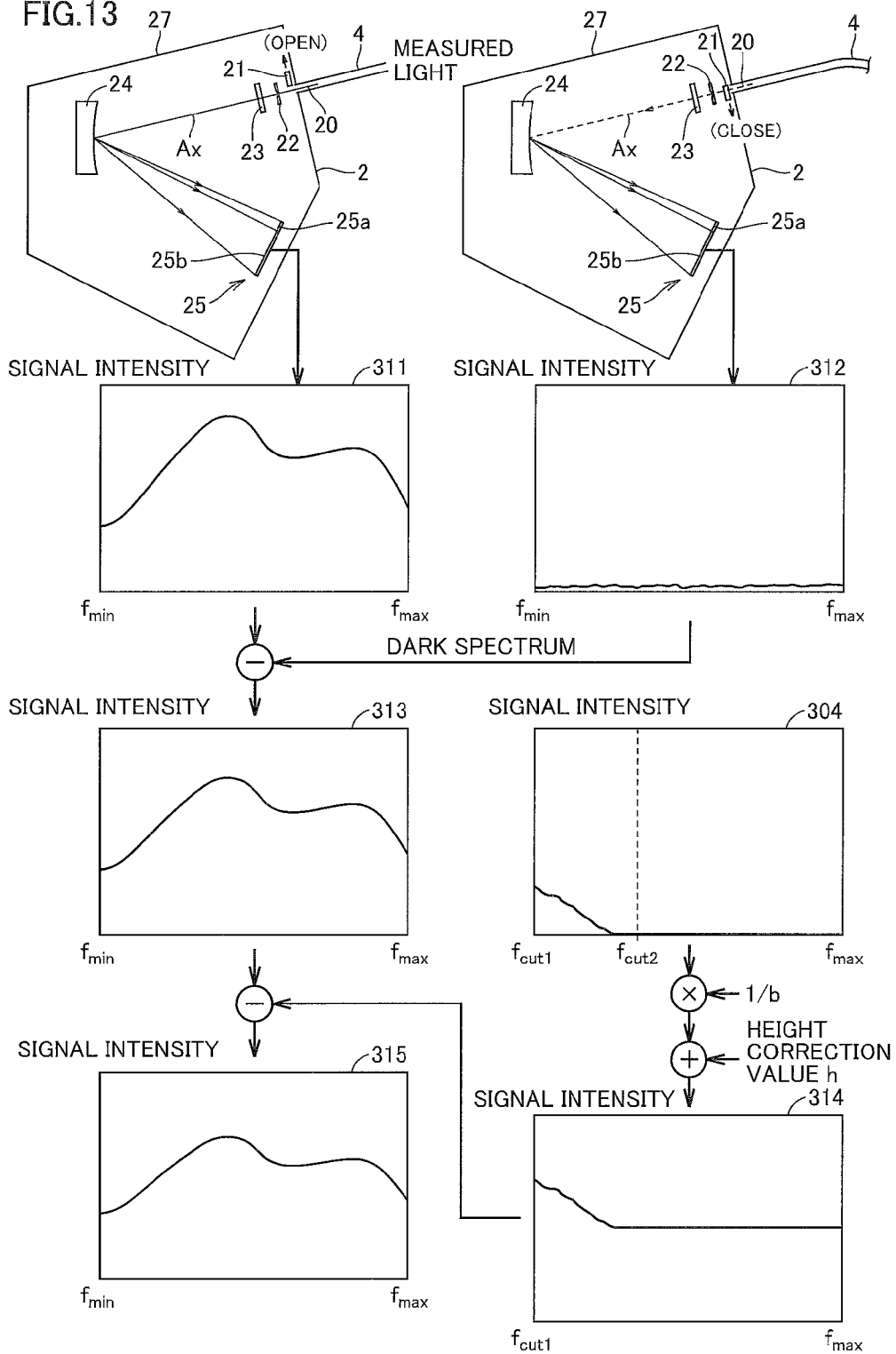
FIG. 13 is a diagram schematically showing processing contents involved with ordinary measurement including dark correction and stray light correction according to the present embodiment.

(f3: Dark Correction/Stray Light Correction (Ordinary Measurement))
FIG. 13 is a diagram schematically showing processing contents involved with ordinary measurement including dark correction and stray light correction according to the present embodiment. Referring to FIG. 13, a measurement spectrum 311 detected while measured light is caused to enter measurement instrument main body 2 and a dark spectrum 312 detected while shutter 21 is driven to the close position so that light does not enter measurement instrument main body 2 are obtained. Then, by subtracting dark spectrum 312 from measurement spectrum 311, a spectrum 313 indicating measured light is calculated.

On the other hand, a stray light spectrum 314 which will be caused by measured light is calculated by correcting stray light pattern 304 obtained in advance. Specifically, stray light pattern 304 is multiplied by a reciprocal of an inclination ratio (1/b) and in addition, height correction value h is uniformly added to the result. Namely, by subjecting stray light pattern 304 to ratio correction (amplitude correction) and height correction (offset correction), stray light spectrum 314 is calculated. As described above, inclination ratio b and height correction value h are calculated based on a component in the wavelength range from $f_{min}$ to $f_{cut1}$ of stray light pattern 304 and spectrum 313.

By subtracting calculated stray light spectrum 314 from spectrum 313 resulting from dark correction, a measurement spectrum 315 indicating spectral characteristics of an object is calculated. This spectrum 315 is output as a measurement result.

Figure 14:
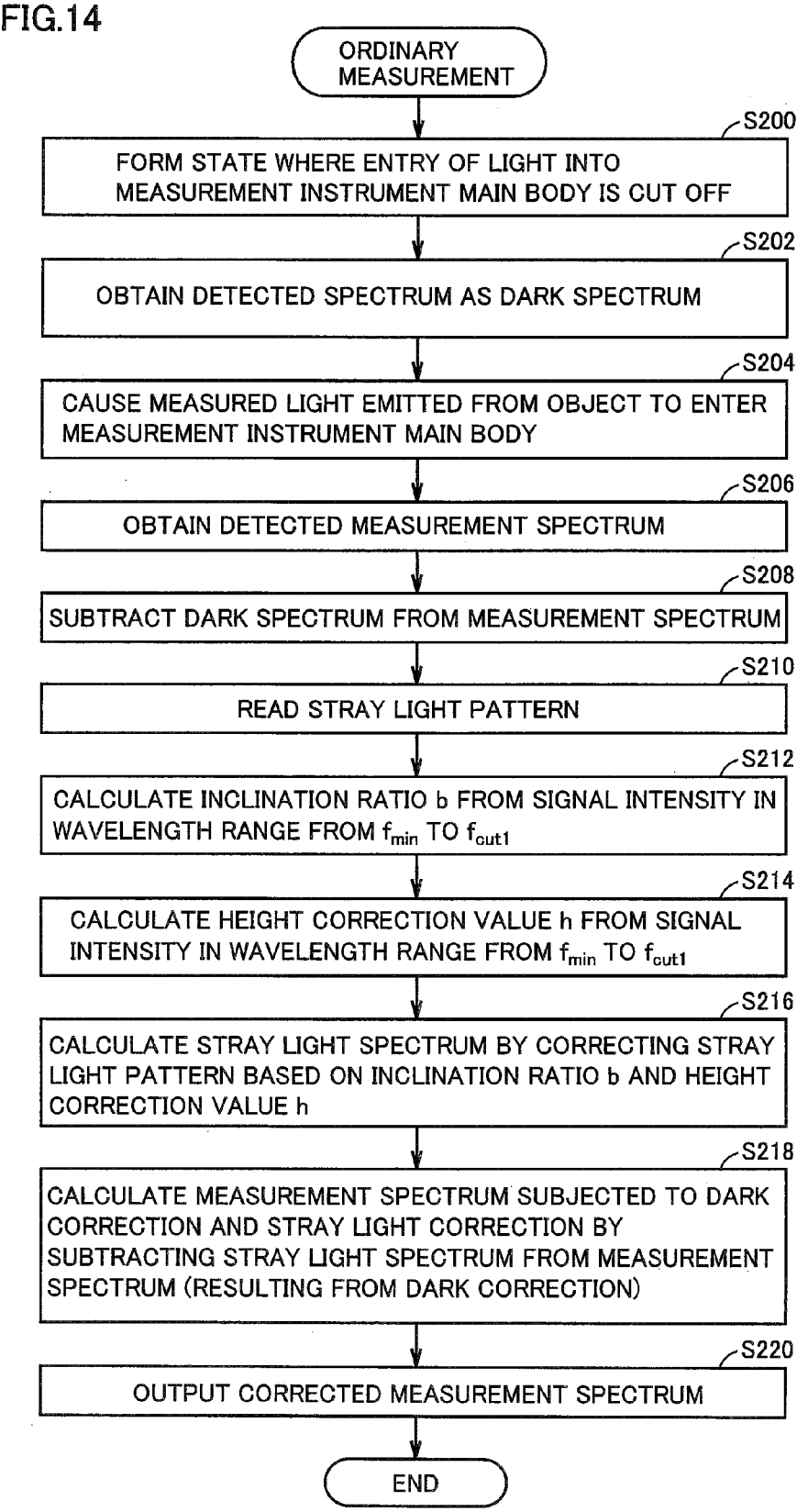
FIG. 14 is a flowchart showing a procedure involved with ordinary measurement including dark correction and stray light correction according to the present embodiment.

FIG. 14 is a flowchart showing a procedure involved with ordinary measurement including dark correction and stray light correction according to the present embodiment. Referring to FIG. 14, initially, processing for obtaining a dark spectrum shown in steps S200 and S202 is performed. In step S200, shutter 21 is driven to the close position so that a state that light is prevented from entering measurement instrument main body 2 is formed (step S200). In this state, a spectrum detected in measurement instrument main body 2 is obtained as a dark spectrum (step S202).

In succession, processing for obtaining a measurement spectrum of measured light shown in steps S204 and S206 is performed. In step S204, the user arranges probe 6 in the proximity of the object and causes measured light emitted from the object to enter measurement instrument main body 2 through optical fiber 4 (step S204). In this state, a measurement spectrum detected in measurement instrument main body 2 is obtained (step S206).

In steps S204 and S206, the step of causing measured light having intensity in the effective wavelength range to be incident on photodetector 25 including correction area 25a associated with spectrometer 24 and configured such that a component in the wavelength range from $f_{min}$ to $f_{cut1}$ is incident thereon and effective detection area 25b configured such that a component in the effective wavelength range on the longer wavelength side of this wavelength range (the wavelength range from $f_{cut1}$ to $f_{max}$) is incident thereon is performed.

It is noted that the processing for obtaining a dark spectrum shown in steps S200 and S202 described above and the processing for obtaining a measurement spectrum shown in steps S204 and S206 may be performed in any order.

In succession, correction processing shown in steps S208 to S220 is performed. Namely, the step of correcting a stray light component caused by measured light with respect to the result of detection by photodetector 25 is performed. In step S208, a measurement spectrum resulting from dark correction is calculated by subtracting the dark spectrum obtained in step S202 from the measurement spectrum obtained in step S206. In this subtraction processing, subtraction is carried out between two corresponding components for each wavelength.

In succession, the stray light pattern obtained in advance is read (step S210). Namely, the stray light pattern representing stray light that will be detected by photodetector 25 is read. As described above, the stray light pattern is obtained from the result of detection in photodetector 25, of reference light having intensity in the partial wavelength range (from $f_{cut2}$ to $f_{max}$) on the longer wavelength side in the effective wavelength range (from $f_{cut1}$ to $f_{max}$).

In succession, inclination ratio b is calculated from the signal intensity in the wavelength range from $f_{min}$ to $f_{cut1}$, in connection with the read stray light pattern and the measurement spectrum (resulting from dark correction) (step S212). In addition, height correction value h is calculated from the signal intensity in the wavelength range from $f_{min}$ to $f_{cut1}$, in connection with the read stray light pattern and the measurement spectrum (resulting from dark correction) (step S214).

The stray light spectrum in the present measurement is calculated by correcting the stray light pattern based on inclination ratio b calculated in step S212 and height correction value h calculated in step S214 (step S216). Namely, in steps S212 to S216, the stray light component derived from measured light is calculated by correcting the stray light pattern based on the first amount of change with respect to wavelengths in the wavelength range from $f_{min}$ to $f_{cut1}$ of the stray light pattern and the second amount of change with respect to wavelengths included in the result of detection in correction area 25a of photodetector 25.

The measurement spectrum subjected to dark correction and stray light correction is calculated by subtracting the calculated stray light spectrum from the measurement spectrum (resulting from dark correction) obtained in step S208 (step S218). This corrected measurement spectrum is output as the result (step S220).

G. Measurement Example

Figure 15:
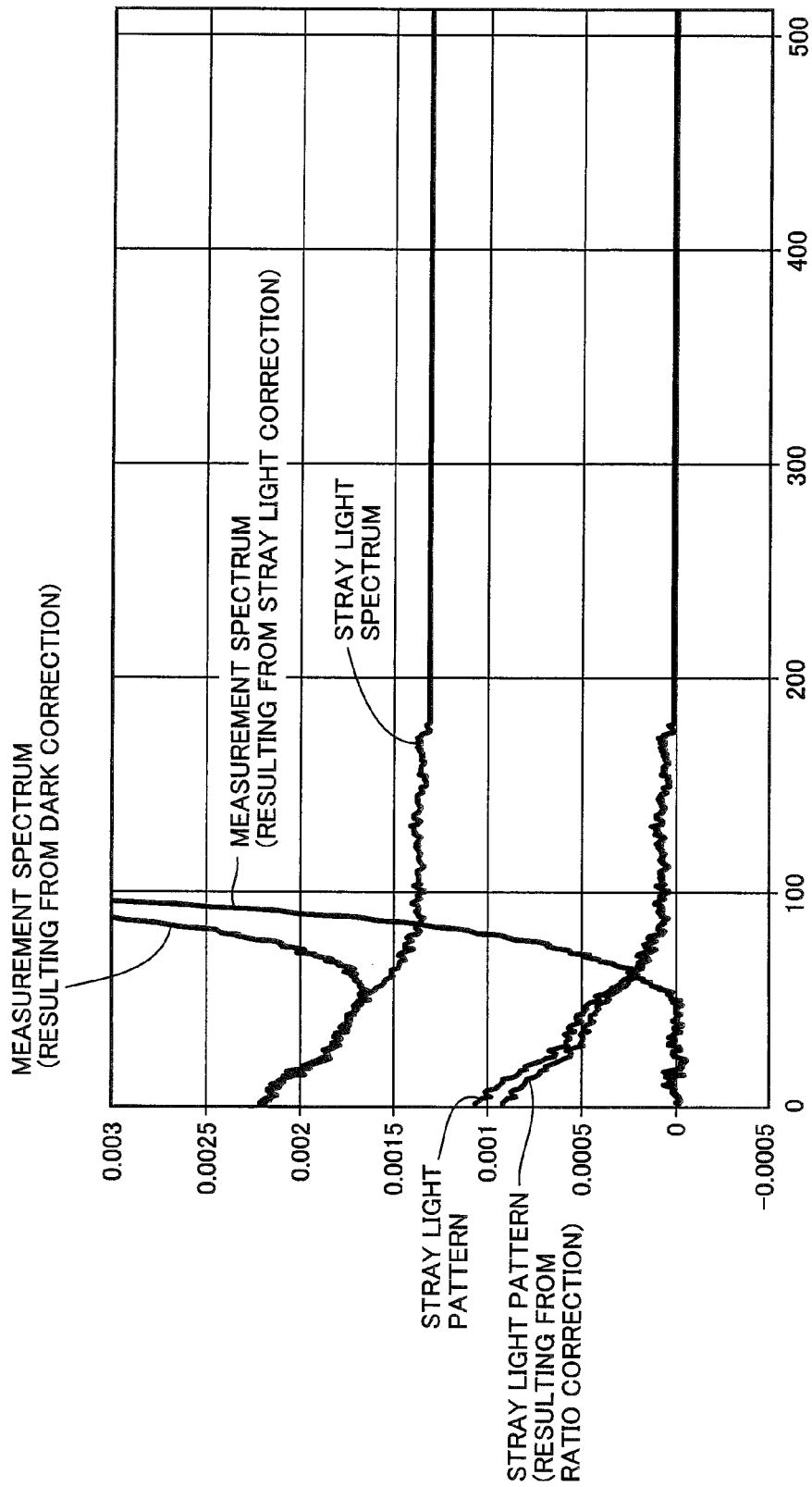
FIG. 15 shows one example of a result of measurement with the use of the spectral characteristic measurement apparatus according to the present embodiment.

Then, one example of a result of measurement with the use of spectral characteristic measurement apparatus 1 according to the present embodiment is shown. FIG. 15 shows one example of a result of measurement with the use of spectral characteristic measurement apparatus 1 according to the present embodiment.

It is assumed that the stray light pattern as shown in FIG. 15 is obtained in advance. Then, it is assumed that measured light from a certain object is measured and the measurement spectrum as shown in FIG. 15 is obtained. It is noted that FIG. 15 shows the measurement spectrum resulting from dark correction.

The stray light pattern is subjected to ratio correction (amplitude correction) and height correction (offset correction), so that the stray light spectrum as shown in FIG. 15 is calculated. Then, the stray light spectrum resulting from stray light correction is calculated by subtracting the stray light pattern from the measurement spectrum.

It can be seen that influence by stray light on the shorter wavelength side which is susceptible to influence by zero-order light can be eliminated by carrying out stray light correction according to the present embodiment as shown in FIG. 15.

H. Variation (h1: First Variation)

In the embodiment described above, a case where measurement instrument main body 2 and processing device 100 are implemented as independent devices respectively has been illustrated, however, these devices may be integrated.

(h2: Second Variation)

In measurement instrument main body 2 shown in FIG. 2, correction area 25a on which light entering housing 27 is not incident is implemented by using internal cut-off filter 23, however, correction area 25a may be provided at any position on which light reflected by spectrometer 24 is not incident.

(h3: Third Variation)

The program according to the present invention may invoke a necessary module from among program modules provided as a part of an operation system (OS) of the computer at prescribed timing in prescribed sequences and to cause the module to perform processing. In that case, the program itself does not include the module above but processing is performed in cooperation with the OS. Such a program not including a module may also be encompassed in the program according to the present invention.

In addition, the program according to the present invention may be provided in a manner incorporated in a part of another program. In that case as well, the program itself does not include a module included in another program above but processing is performed in cooperation with another program. Such a program incorporated in another program may also be encompassed in the program according to the present invention.

Moreover, the functions implemented by the program according to the present invention may partially or entirely be implemented by dedicated hardware.

I. Advantages

According to the present embodiment, a stray light pattern indicating a stray light component inherent in measurement instrument main body 2 is obtained in advance in spectral characteristic measurement apparatus 1, the stray light pattern is corrected in accordance with a situation at the time of each measurement (that is, a stray light spectrum is estimated), and then the stray light spectrum is subtracted from a measurement spectrum. Thus, spectral characteristics (spectrum) of an object to be measured from which influence of the stray light component has been lessened can be calculated. In addition, together with stray light correction, influence by a dark current or the like that flows in a photodetector is also lessened through dark correction. As a result of such correction, a spectrum of an object to be measured can be obtained with higher accuracy.

By thus dynamically correcting the stray light pattern in accordance with incident measured light, a stray light spectrum depending on change in a measurement light source can more precisely be estimated. According to the findings of the inventors of the present application, intensity of zero-order light which is a main factor for stray light, that is, total energy of measured light, is different for each light source and a spectrum of caused stray light may also vary. The basic stray light pattern, however, does not vary, because it is determined by positional relation of a spectrometer, a photodetector, and the like. Therefore, influence by zero-order light is evaluated based on an amount of change (inclination) with respect to wavelengths, the stray light pattern is expanded or reduced in the amplitude direction based on the evaluation result, and offset correction is carried out, so that the stray light spectrum depending on a light source can more precisely be estimated.

In addition, according to the present embodiment, unlike such a configuration that a correction pattern is defined by an approximation function or the like, the stray light pattern is calculated from the measured stray light spectrum, and hence it is not necessary to set a parameter or the like separately from spectral characteristic measurement apparatus 1.

Moreover, according to the present embodiment, an area on which no measured light is incident (correction area 25a) and an area on which measured light is incident (effective detection area 25b) are provided in a detection surface of photodetector 25, and a stray light spectrum is calculated based on the result of detection in correction area 25a. Therefore, in ordinary measurement, such a mechanical operation as replacing an internal cut-off filter is not necessary and a stray light spectrum is calculated by using signal intensity detected along with detection of the measurement spectrum. Thus, a processing time period can be reduced. In other words, stray light correction and measurement with higher accuracy can be carried out while avoiding increase in processing time period.

Further, according to the present embodiment, since a stray light spectrum in accordance with a situation is estimated for each measurement, measurement with high accuracy can be conducted in a stable manner even in such a situation that an environment (for example, a temperature) significantly varies in a short period of time.

Furthermore, according to the present embodiment, by using a plurality of external cut-off filters at the time when a stray light pattern is obtained, a range of stray light spectra caused in a measurement instrument main body of interest can be checked and then an appropriate external cut-off filter and a stray light pattern can be obtained.

The description above will clarify other advantages involved with a light distribution characteristic measurement apparatus according to the present embodiment.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A spectral characteristic measurement apparatus, comprising:
    a spectrometer for spatially dispersing incident light depending on wavelengths,
    a detection portion for receiving light dispersed by the spectrometer, the detection portion including a first detection area on which a component in a first wavelength range is incident and a second detection area on which a component in a second wavelength range on a longer wavelength side of the first wavelength range is incident;
    a filter arranged in a stage preceding the spectrometer, for cutting off the first wavelength range;
    a storage portion for storing a stray light pattern representing stray light that will be detected by the detection portion, the stray light pattern corresponding to a result of detection in the detection portion, of reference light having intensity in a partial wavelength range on a longer wavelength side in the second wavelength range; and
    a correction portion configured to correct stray light detected by the detection portion caused by measured incident light, wherein
    the correction portion is adapted to:
        expand or reduce the stray light pattern in an amplitude direction based on a first amount of change with respect to wavelengths in the first wavelength range of the stray light pattern and a second amount of change with respect to wavelengths included in the result of detection in the first detection area of the detection portion, and carry out offset correction of the expanded or reduced stray light pattern in accordance with a difference in amplitude in the first wavelength range between the expanded or reduced stray light pattern and a detected spectrum of the measured incident light, to output a stray light component of the measured incident light.

2. The spectral characteristic measurement apparatus according to claim 1, wherein
the correction portion is adapted to correct the stray light pattern such that, in the second wavelength range, the corrected stray light pattern matches in waveform with a measurement spectrum obtained by detection of the measured incident light.

3. The spectral characteristic measurement apparatus according to claim 1, wherein
the first and second amounts of change include inclination with respect to wavelengths.

4. A spectral characteristic measurement method, comprising:
causing measured incident light, which has intensity in a second wavelength range, to be incident on a detection portion including a first detection area associated with a spectrometer and configured such that a component in a first wavelength range is incident thereon and a second detection area configured such that a component in the second wavelength range on a longer wavelength side of the first wavelength range is incident thereon; and
correcting a stray light component caused by the measured incident light, with respect to a result of detection in the detection portion, wherein
the correcting step includes
reading a stray light pattern representing stray light that will be detected by the detection portion, the stray light pattern corresponding to a result of detection in the detection portion, of reference light having intensity in a partial wavelength range on a longer wavelength side in the second wavelength range,
expanding or reducing the stray light pattern in an amplitude direction based on a first amount of change with resect to wavelengths in the first wavelength range of the stray light pattern and a second amount of change with respect to wavelengths included in the result of detection in the first detection area of the detection portion, and
carrying out offset correction of the expanded or reduced stray light pattern in accordance with a difference in amplitude in the first wavelength range between the expanded or reduced stray light pattern and a detected spectrum of the measured incident light, to output a stray light component of the measured incident light.

5. The spectral characteristic measurement method according to claim 4, wherein
the correcting step includes correcting the stray light pattern such that, in the second wavelength range, the corrected stray light pattern matches in waveform with a measurement spectrum obtained by detection of the measured incident light.

6. The spectral characteristic measurement method according to claim 4, wherein
the first and second amounts of change include inclination with respect to wavelengths.

* * * * *